(12) United States Patent
Lane (10) Patent No.: US 10,756,984 B2
(45) Date of Patent: Aug. 25, 2020

(54) METHOD AND APPARATUS FOR CREATING AND MANAGING NETWORK DEVICE PORT VLAN CONFIGURATIONS

(71) Applicant: Pakedge Device & Software, Inc., Hayward, CA (US)

(72) Inventor: Nathan Dennison Lane, La Habra, CA (US)

(73) Assignee: WirePath Home Systems, LLC, Salt Lake City, UT (US)

( * ) Notice: Subject to any disclaimer, the term of this patent is extended or adjusted under 35 U.S.C. 154(b) by 472 days.

(21) Appl. No.: 14/751,978

(22) Filed: Jun. 26, 2015

(65) Prior Publication Data

US 2016/0301577 A1    Oct. 13, 2016

Related U.S. Application Data

(60) Provisional application No. 62/146,602, filed on Apr. 13, 2015.

(51) Int. Cl.
*G06F 3/048* (2013.01)
*H04L 12/24* (2006.01)
*H04L 12/46* (2006.01)

(52) U.S. Cl.
CPC .......... *H04L 41/22* (2013.01); *H04L 12/4675* (2013.01); *H04L 12/4679* (2013.01)

(58) Field of Classification Search
CPC ................ H04L 41/22; G06F 3/0481–0489
See application file for complete search history.

(56) References Cited

U.S. PATENT DOCUMENTS

| 5,452,415 A | * | 9/1995 | Hotka | H04L 41/5048 |
| | | | | 709/224 |
| 5,541,586 A | * | 7/1996 | Wise | H04N 21/2383 |
| | | | | 340/12.32 |

(Continued)

OTHER PUBLICATIONS

Netgear, "GS108T and GS110TP Smart Switch Software Administration Manual", ver. 2.0, published on Nov. 2010 by Netgear Inc. http://www.downloads.netgear.com/files/GS108T_GS110TP_SWA_5Nov10.pdf.*

(Continued)

*Primary Examiner* — Steven B Theriault
(74) *Attorney, Agent, or Firm* — Austin Rapp (57) ABSTRACT

A method for managing VLAN configurations on a network device includes connecting, by a client, to the network device. The method then includes presenting, by the client, a graphical user interface of the network device to a user of the client. The graphical user interface comprises a first area displaying a plurality of ports of the network device and a second area displaying a configuration interface. The configuration interface enables the user to make a VLAN assignment for each of the plurality of ports. Both the first area and the second area are displayed on one page in the graphical user interface. The method then includes accepting, through the graphical user interface, user instructions for making the VLAN assignment. The method then includes transmitting, by the client, a signal to the network device, the signal encoding the user instructions and enabling the network device to make the VLAN assignment.

19 Claims, 5 Drawing Sheets

(56) References Cited

U.S. PATENT DOCUMENTS

| | | | | |
|---|---|---|---|---|
| 5,606,664 A * | 2/1997 | Brown | ................... | H04L 41/12 340/2.7 |
| 5,666,359 A * | 9/1997 | Bennett | ................... | H04L 12/44 370/358 |
| 5,751,965 A * | 5/1998 | Mayo | ................... | H04L 41/0213 709/224 |
| 5,819,042 A * | 10/1998 | Hansen | ................... | H04L 41/0883 709/222 |
| 5,821,937 A * | 10/1998 | Tonelli | ................... | H04L 41/12 709/225 |
| 5,832,503 A | 11/1998 | Malik et al. | | |
| 5,874,964 A * | 2/1999 | Gille | ................... | H04L 12/4675 715/734 |
| 6,061,334 A | 5/2000 | Berlovitch et al. | | |
| 6,112,015 A * | 8/2000 | Planas | ................... | H04L 41/22 709/220 |
| 6,243,756 B1 * | 6/2001 | Whitmire | ................... | H04L 12/4625 358/1.13 |
| 6,385,197 B1 | 5/2002 | Sugihara | | |
| 6,477,486 B1 * | 11/2002 | Ram | ................... | G06F 11/273 702/183 |
| 6,577,327 B1 * | 6/2003 | Rochford | ................... | H04L 12/4641 709/223 |
| 6,779,027 B1 * | 8/2004 | Schunicht | ................... | H04L 41/00 370/254 |
| 6,906,734 B2 * | 6/2005 | Subramanian | ................... | H04L 41/0853 709/223 |
| 6,957,263 B2 * | 10/2005 | Galou | ................... | H04L 41/0806 709/219 |
| 7,024,627 B2 * | 4/2006 | Kumar | ................... | H04Q 11/0414 455/423 |
| 7,039,870 B2 * | 5/2006 | Takaoka | ................... | H04L 41/22 709/224 |
| 7,043,691 B1 * | 5/2006 | Kwon, II | ................... | H04N 5/44 348/E5.096 |
| 7,076,739 B2 * | 7/2006 | Yasuda | ................... | G06F 17/5009 715/769 |
| 7,113,934 B2 * | 9/2006 | Levesque | ................... | H04L 41/20 |
| 7,310,774 B1 * | 12/2007 | Arquie | ................... | H04L 41/12 715/734 |
| 7,312,715 B2 * | 12/2007 | Shalts | ................... | H04Q 1/06 29/593 |
| 7,312,719 B2 * | 12/2007 | Hsieh | ................... | H04L 43/0817 340/644 |
| 7,315,985 B1 * | 1/2008 | Gauvin | ................... | H04L 41/12 715/734 |
| 7,342,891 B2 * | 3/2008 | Chen | ................... | H04L 41/06 370/241 |
| 7,360,158 B1 * | 4/2008 | Beeman | ................... | G06Q 30/02 715/705 |
| 7,493,562 B2 | 2/2009 | Kui et al. | | |
| 7,523,187 B1 * | 4/2009 | Lavallee | ................... | H04L 41/12 709/220 |
| 7,564,795 B2 * | 7/2009 | Stephenson | ................... | H04W 24/02 370/241 |
| 7,843,906 B1 * | 11/2010 | Chidambaram | ................... | H04L 47/6205 370/386 |
| 7,860,698 B2 * | 12/2010 | Yamazaki | ................... | G06F 17/509 703/13 |
| 8,018,943 B1 * | 9/2011 | Pleshek | ................... | H04L 43/028 370/254 |
| 8,098,677 B1 * | 1/2012 | Pleshek | ................... | H04L 43/12 370/351 |
| 8,103,801 B1 * | 1/2012 | Sardella | ................... | G06F 11/325 710/1 |
| 8,116,434 B2 * | 2/2012 | German | ................... | H01R 13/6683 379/32.01 |
| 8,161,390 B2 * | 4/2012 | Takeda | ................... | H04L 41/22 715/735 |
| 8,374,182 B2 * | 2/2013 | Mehta | ................... | H04L 12/4641 370/390 |
| 8,464,168 B2 * | 6/2013 | Bump | ................... | G05B 23/0216 700/90 |
| 8,643,476 B2 * | 2/2014 | Pinn | ................... | H04Q 1/136 340/10.1 |
| 8,650,490 B2 * | 2/2014 | Hourselt | ................... | G06T 11/206 715/734 |
| 8,751,649 B2 | 6/2014 | Villait et al. | | |
| 8,892,696 B1 * | 11/2014 | Thai | ................... | H04L 41/0886 370/254 |
| 9,025,533 B1 * | 5/2015 | Lok | ................... | H04L 12/4679 370/328 |
| 9,049,146 B2 * | 6/2015 | Liu | ................... | H04L 41/0806 |
| 9,100,615 B2 * | 8/2015 | Majid | ................... | H04N 5/445 |
| 9,123,217 B2 * | 9/2015 | Pinn | ................... | H04Q 1/09 |
| 9,384,113 B1 * | 7/2016 | Moy | ................... | G06F 11/325 |
| 9,435,713 B2 * | 9/2016 | Collier | ................... | G01M 11/3136 |
| 9,442,810 B2 * | 9/2016 | Jaisinghani | ................... | H04L 41/12 |
| 9,544,181 B1 * | 1/2017 | Aithal | ................... | H04L 41/0213 |
| 9,697,304 B1 * | 7/2017 | Wendlandt | ................... | G06F 17/5009 |
| 9,710,595 B2 * | 7/2017 | Conzola | ................... | G06F 17/509 |
| 9,912,556 B1 * | 3/2018 | Hendin | ................... | H04L 43/0811 |
| 10,153,954 B2 * | 12/2018 | Malone | ................... | H04L 41/24 |
| 10,264,332 B1 * | 4/2019 | Sable | ................... | H04Q 1/24 |
| 2002/0138227 A1 * | 9/2002 | Yasuda | ................... | G06F 17/5009 702/120 |
| 2002/0186259 A1 * | 12/2002 | Meandzija | ................... | H04L 12/18 715/853 |
| 2003/0085914 A1 * | 5/2003 | Takaoka | ................... | H04L 41/22 715/734 |
| 2004/0015309 A1 * | 1/2004 | Swisher | ................... | H04L 41/0813 702/79 |
| 2004/0042454 A1 * | 3/2004 | Zabihi | ................... | H04L 12/4641 370/392 |
| 2004/0085347 A1 * | 5/2004 | Hagarty, Jr. | ................... | H04L 41/12 715/735 |
| 2004/0098422 A1 * | 5/2004 | Levesque | ................... | H04L 41/20 |
| 2004/0128380 A1 * | 7/2004 | Chen | ................... | G06Q 10/063 709/224 |
| 2004/0133667 A1 * | 7/2004 | Chen | ................... | H04L 41/06 709/223 |
| 2005/0091396 A1 * | 4/2005 | Nilakantan | ................... | H04L 45/04 709/232 |
| 2005/0135056 A1 * | 6/2005 | Suzuki | ................... | G06F 3/0614 361/679.33 |
| 2005/0210123 A1 * | 9/2005 | Wang | ................... | H04L 41/0253 709/218 |
| 2006/0007491 A1 * | 1/2006 | Kanda | ................... | H04L 41/0803 358/1.16 |
| 2006/0026509 A1 * | 2/2006 | Porter | ................... | H04L 41/22 715/246 |
| 2006/0064526 A1 * | 3/2006 | Smith | ................... | H04Q 1/136 710/104 |
| 2006/0187853 A1 * | 8/2006 | Mititelu | ................... | H04L 12/467 370/254 |
| 2007/0136467 A1 * | 6/2007 | Masci | ................... | G06F 15/02 709/225 |
| 2007/0140138 A1 * | 6/2007 | Goffin | ................... | H04L 65/80 370/252 |
| 2007/0143465 A1 * | 6/2007 | Gonzalez | ................... | H04L 41/0816 709/223 |
| 2007/0174528 A1 * | 7/2007 | Mantver | ................... | G06F 1/266 710/100 |
| 2007/0279666 A1 * | 12/2007 | Lee | ................... | G06F 3/1204 358/1.13 |
| 2007/0286411 A1 * | 12/2007 | King | ................... | H04Q 1/032 379/442 |
| 2008/0030362 A1 * | 2/2008 | Huang | ................... | H04L 41/0681 340/815.45 |
| 2008/0046551 A1 * | 2/2008 | Hall | ................... | H04L 41/0813 709/223 |
| 2008/0092069 A1 * | 4/2008 | Chan | ................... | G06F 3/04817 715/763 |
| 2008/0222285 A1 * | 9/2008 | Hickey | ................... | H04L 41/0893 709/224 |
| 2008/0267090 A1 * | 10/2008 | Okita | ................... | H04L 12/66 370/254 |

(56) References Cited

U.S. PATENT DOCUMENTS

| | | | | |
|---|---|---|---|---|
| 2008/0304423 A1* | 12/2008 | Chuang | H04L 12/4666 | 370/253 |
| 2008/0309511 A1* | 12/2008 | Kerr | G06F 1/1613 | 340/815.53 |
| 2009/0152216 A1* | 6/2009 | Champion | G06F 1/183 | 211/26 |
| 2009/0171629 A1* | 7/2009 | Hirose | H04L 12/4641 | 703/1 |
| 2009/0279549 A1* | 11/2009 | Ramanathan | G06F 8/65 | 370/395.4 |
| 2010/0115415 A1* | 5/2010 | Hickey | H04L 41/0253 | 715/736 |
| 2010/0128432 A1* | 5/2010 | Miller | G06F 1/20 | 361/679.54 |
| 2010/0254374 A1* | 10/2010 | Fortier | H04Q 1/13 | 370/352 |
| 2011/0022695 A1* | 1/2011 | Dalal | G06F 9/5077 | 709/222 |
| 2011/0058560 A1* | 3/2011 | Okita | H04L 12/4637 | 370/395.53 |
| 2011/0149800 A1* | 6/2011 | Ryan | H04L 12/467 | 370/254 |
| 2011/0209082 A1* | 8/2011 | Conzola | G06F 17/509 | 715/771 |
| 2011/0243142 A1* | 10/2011 | Kwon | H04L 41/5041 | 370/400 |
| 2011/0302496 A1* | 12/2011 | Pugaczewski | H04L 41/00 | 715/735 |
| 2012/0297379 A1* | 11/2012 | Anderson | G06F 9/45558 | 718/1 |
| 2013/0058255 A1 | 3/2013 | Casado et al. | | |
| 2013/0091534 A1* | 4/2013 | Gilde | H04L 63/0227 | 726/1 |
| 2013/0117766 A1* | 5/2013 | Bax | G06F 9/4405 | 719/323 |
| 2013/0223684 A1* | 8/2013 | Townend | G06Q 10/08 | 382/103 |
| 2013/0227097 A1* | 8/2013 | Yasuda | H04L 41/0813 | 709/222 |
| 2013/0246673 A1* | 9/2013 | Cox | H04L 41/0806 | 710/104 |
| 2013/0265882 A1* | 10/2013 | Li | H04L 43/0805 | 370/241 |
| 2014/0059440 A1* | 2/2014 | Sasaki | H04L 41/145 | 715/735 |
| 2014/0075320 A1* | 3/2014 | Sasaki | H04L 12/40 | 715/736 |
| 2014/0137023 A1* | 5/2014 | Lin | G06F 3/04845 | 715/771 |
| 2014/0280809 A1* | 9/2014 | Li | H04L 41/0806 | 709/222 |
| 2014/0281937 A1* | 9/2014 | Jacobs | G06F 3/1208 | 715/255 |
| 2016/0044035 A1* | 2/2016 | Huang | H04L 63/0272 | 726/4 |
| 2016/0091685 A1* | 3/2016 | Raza | G02B 6/4452 | 398/19 |
| 2016/0134484 A1* | 5/2016 | Tanaka | H04L 41/145 | 345/633 |
| 2016/0173340 A1* | 6/2016 | Latham | H04L 41/145 | 370/254 |
| 2016/0182293 A1* | 6/2016 | Di Benedetto | H04L 41/0816 | |
| 2016/0191314 A1* | 6/2016 | Russell | H04L 41/22 | 709/221 |
| 2016/0291838 A1* | 10/2016 | Tashiro | G06F 3/04812 | |
| 2018/0234306 A1* | 8/2018 | Pathan | H04L 67/10 | |

OTHER PUBLICATIONS

Wikipedia, "Mobile browser", https://en.wikipedia.org/wiki/Mobile_browser.*

Wikipedia, "Virtual LAN", https://en.wikipedia.org/wiki/Virtual_LAN.*

Cisco, "Using the Web Graphical User Interface", published on Oct. 7, 2013 by Cisco, https://www.cisco.com/c/en/us/td/docs/switches/lan/catalyst3650/software/release/3se/ha_stack_manager/configuration_guide/b_hastck_3se_3650_cg/b_hastck_3se_3650_cg_chapter_0101.pdf.*

Christhu Raj et al., "A Comprehensive Overview on Different Network Simulators", International Journal of Engineering and Technology vol. 5 No. 1 Feb.-Mar. 2013 (Year: 2013).*

Cisco, "UCS Uplink Ethernet Connection Conguration Example", published on Apr. 27, 2010, [online] https://www.cisco.com/c/en/us/support/docs/servers-unified-computing/ucs-6120xp-20-port-fabric-interconnect/110267-ucs-uplink-ethernet-connection.html (Year: 2010).*

Hewlett-Packard Development Company et. al. "HP1910 Gigabit Ethernet Switch Series, User Guide" 2013 (Year: 2013).*

Jalan, Raj et. al. "Patch Panel Management using drag and drop and asset templates with v5. 11. 0" Oct. 4, 5, 2015 Retrieved from internet 2019 : https://www.device42.com/blog/2014/10/patch-panel-rnanagement-using-drag-and-drop-and-asset-ternplates-with-v5-11-0/ (Year: 2014).*

D-Link et. al. "DES-1100-16/24 EasySmart Switch Manual", 2010 (Year: 2010).*

D-Link et. al. "DES-1100-10MP Websmart Switch Manual" v 1.0, 2010 (Year: 2010).*

* cited by examiner

METHOD AND APPARATUS FOR CREATING AND MANAGING NETWORK DEVICE PORT VLAN CONFIGURATIONS

CROSS-REFERENCE TO RELATED PATENT APPLICATIONS

This application claims priority from Provisional U.S. Application 62/146,602, filed Apr. 13, 2015, titled "METHOD FOR CREATING AND MANAGING PORT VLAN CONFIGURATIONS," which is incorporated herein by reference in its entirety.

BRIEF DESCRIPTION OF THE DRAWINGS

Exemplary embodiments are described herein with reference to the following Figures, wherein.

DETAILED DESCRIPTION

The detailed description set forth below in connection with the appended drawings is intended as a description of various aspects of certain exemplary embodiments and is not intended to represent the only aspects of those embodiments. Each aspect described in this disclosure is provided merely as an example or illustration, and should not necessarily be construed as preferred or advantageous over other aspects. The detailed description includes specific details for providing a thorough understanding of the present disclosure. However, it will be apparent to those skilled in the art that the present disclosure can be practiced without these specific details. Acronyms and other descriptive terminology can be used merely for convenience and/or clarity and are not intended to limit the scope of the present disclosure. Any steps in a method should not necessarily be construed as needing to be carried out in the order listed, unless so stated. The term "can," used throughout the detailed description, refers generally to something that is possible or is permissible, and should not be viewed as limiting the disclosure to the thing described.

Embodiments of the present disclosure relate generally to configuration of network device ports. Particular embodiments relate to a user interface for creating and managing network device port VLAN configurations. This is achieved using an interactive user interface along with a guided design to streamline complex configuration changes. Although the present disclosure is in reference to network device port VLAN configuration, other port configurations can be performed as well, such as port mode configuration.

According to certain embodiments, a network device can be managed through a client. In some embodiments, a server can intermediate the communication. Many embodiments provide a method comprising communication between the client and the network device, and updating of a configuration file on the network device to reflect user inputs made in the graphical user interface (GUI) of the client.

Previous VLAN configuration methods used a strictly text based approach. The ports had to be selected one at a time for configuration. Information and settings were located across multiple pages instead of on one central VLAN configuration page. The embodiments of the present disclosure, when compared to past methods, provide a faster and easier way to create and modify VLAN configurations on a network device because all of the relevant information, including VLAN visualization and configuration options, are brought to one page. In the present disclosure, "page" refers to a broad area of configuration in a GUI that, when interacted with, does not appear to reload the GUI or to load a new GUI. In embodiments of the present disclosure, the display of configuration settings is also easier to understand. One component on the page provides an easy to understand view of the network device ports, along with their current configuration. Another component on the page shows the multiple VLAN configuration settings. A third component on the page allows the user to configure and change the settings on the network device. The visualization components connect with the configuration components to show current settings and make editing the network device configurations possible.

A graphical user interface of the present disclosure enables port visualization, VLAN setting visualization, and VLAN configuration manipulation (comprising options to add, edit, and/or delete VLANs). A user, who as a non-limiting example can be a network administrator, can create and edit VLANs, can assign VLANs to groups of ports, can configure VLANs as tagged or untagged, and/or can specify access, hybrid, and/or trunk modes for multiple ports all from one page. Applying the access mode to a port configures it for untagged traffic only, with a port VLAN ID set as selected. Applying the hybrid mode to a port configures it to have at least one untagged port VLAN ID, and at least one tagged VLAN ID. Applying the trunk mode to a port configures it for tagged traffic only, with one or more tagged VLAN IDs. All designations and assignments made by the user can then be reflected in a view depicting the ports of the networked device along with their related configurations.

The network device port VLAN configurations can use color coding to match a VLAN with a port. A user can make a variety of inputs in the graphical user interface, including specifying VLAN ID numbers, VLAN name text, and mouse selection input. Some of the outputs that can be displayed by the graphical user interface include: network device port VLAN settings, VLANs added to the system, and VLAN configurations.

When the user connects to the network device and is served up the HTML GUI in their client's web browser, the user can choose an option to configure VLANs. The user can then select whether they want to do a basic configuration or an advanced configuration. A basic configuration can include a guided port configuration or a template port configuration. An advanced configuration can include a manual port configuration. Each of the configuration options—manual port configuration, guided port configuration, and template port configuration—are disclosed herein. The user can switch between manual, guided, and template configuration options by selecting their desired option from the same page where they perform the configurations. This enables the user to easily select and switch between configuration methods while still remaining on the same page.

Figure 1:
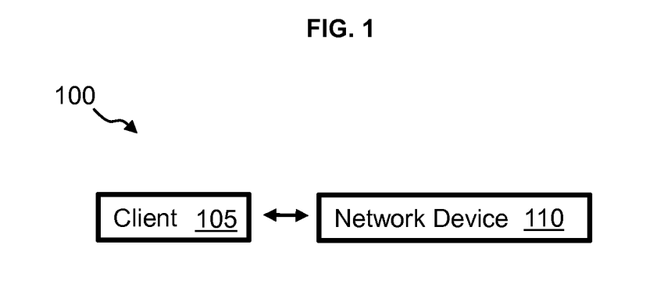
FIG. 1 is a chart showing components of an exemplary system, and exemplary communication between the components.

Referring to FIG. 1, a chart showing components of system 100, and exemplary communication between the components, is shown. System 100 can include a client 105 and a network device 110. In other embodiments, other components can intermediate the communication between the client 105 and the network device 110. As a non-limiting example, an intermediary device can be a server. The client 105 can be any device that has networking/web capabilities and a screen to display a graphical user interface. A client 105 can be, as non-limiting examples, a computer or a smartphone. The network device 110 can be any device with ports and with a CPU or an embedded "system on a chip." In the present embodiment, the network device 110 is a 24 port managed Ethernet switch, with the switch's HTML GUI being accessed through a web browser on client 105. However, the present disclosure is not limited to a 24 port managed Ethernet switch.

Figure 2:
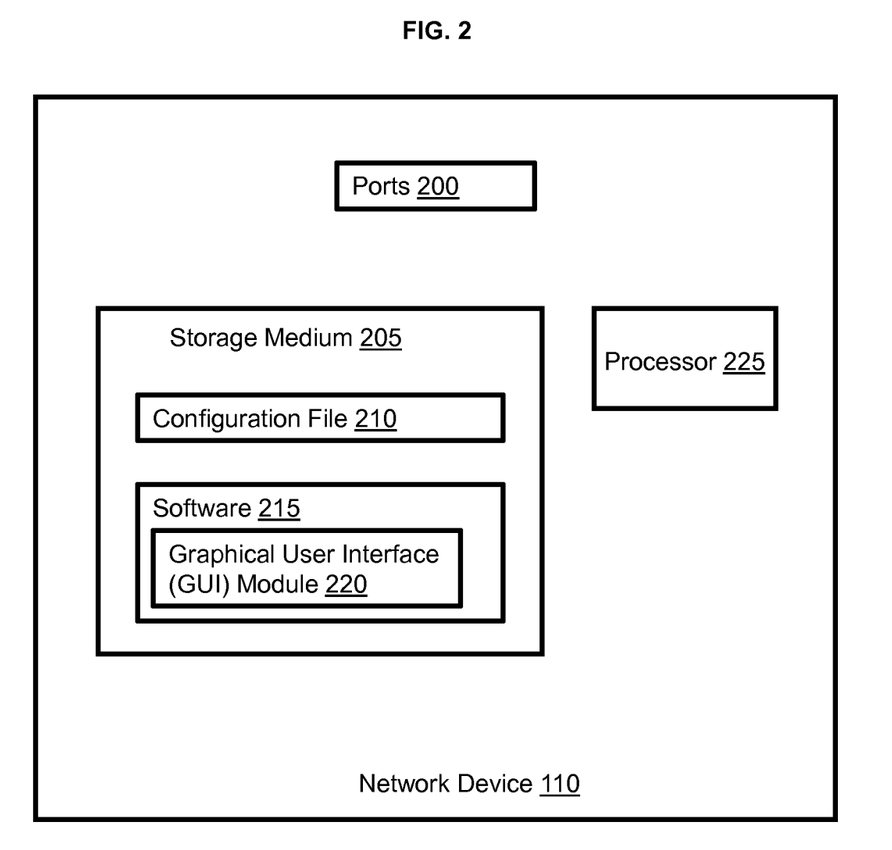
FIG. 2 shows exemplary components of an exemplary network device.

FIG. 2 shows exemplary components of an exemplary network device 110. A network device 110 can have, as a non-limiting example, ports 200, a storage medium 205, a configuration file 210 and software 215 stored in storage medium 205, and a processor 225. Software 215 can have a GUI module 220 which can be used to serve up a graphical user interface to the client 105. Processor 225 can be a "system on a chip" or a CPU, and can be used to run software 215 to enable a user of client 105 to interact with network device 110.

Figure 3:
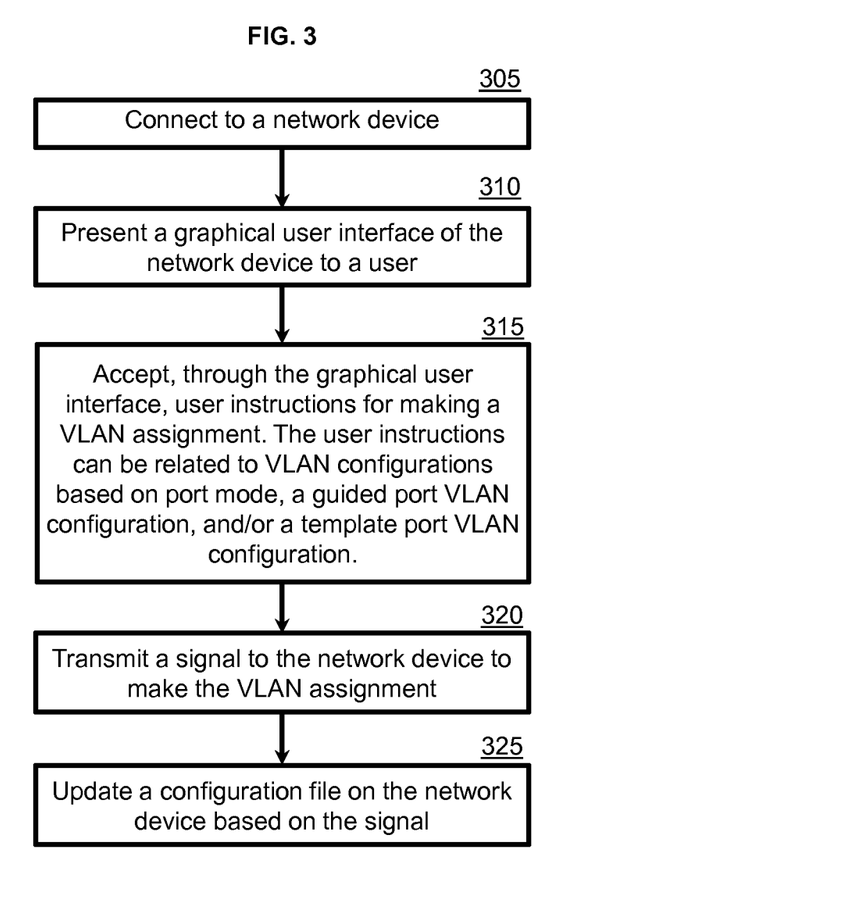
FIG. 3 is a chart describing an exemplary method.

Referring to FIG. 3, a chart describing an exemplary method is shown. The method can comprise a step 305 of connecting, by a client 105, to a network device 110. Step 310 can comprise presenting a graphical user interface, served up by GUI module 220, of the network device 110 to a user of the client 105. Step 315 can comprise accepting, through the graphical user interface, user instructions for making a VLAN assignment. As non-limiting examples, the VLAN assignment can be an access mode port VLAN configuration, a hybrid mode port VLAN configuration, a trunk mode port VLAN configuration, a guided port VLAN configuration, and/or a template port VLAN configuration. Step 320 can comprise transmitting a signal to the network device 110 to make the VLAN assignment. Step 325 can comprise updating configuration file 210 on network device 110 based on the transmitted signal. In such a manner, the method results in a user being able to create and manage VLAN configurations of network device 110. All of the VLAN assignments can be initiated from one page. This greatly decreases the time needed to create and modify VLAN settings, and also makes the display of configuration information much simpler to understand.

Figure 4:
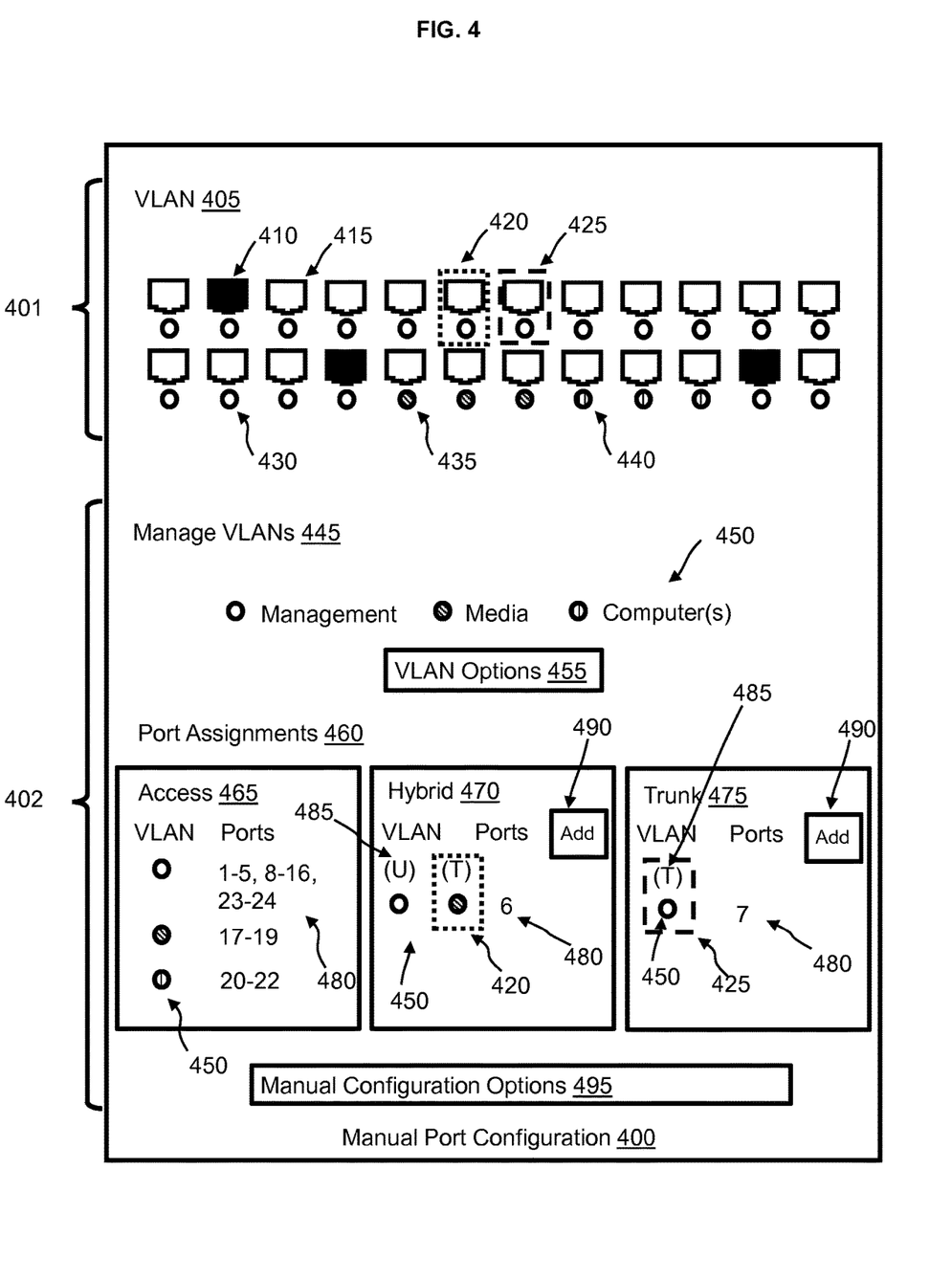
FIG. 4 shows an exemplary manual port configuration GUI layout.

Referring to FIG. 4, an exemplary manual port configuration GUI layout is shown. In other embodiments, the GUI layout can look different and different graphical representations can be used. Client 105 can display a GUI for manual port configuration 400. The GUI can have a first area 401 showing graphical representation of ports 200 of network device 110. The GUI can have a second area 402 showing VLAN configuration setting and options for network device 110. Second area 402 can change as a user switches between different methods of VLAN configuration, but first area 401 can remain largely the same, displaying graphical representations of ports 200 and their current or temporary assigned settings. First area 401 can have a VLAN section 405 which graphically displays the VLANs associated with ports 200 of network device 110. Ports 200 can be displayed as active ports 410 or inactive ports 415. Ports can also have a hybrid mode indicator 420 or a trunk mode indicator 425. In the present embodiment, a default access mode port has no indicator. However, an indicator can be used if desired. Ports can also have a first VLAN indicator 430, a second VLAN indicator 435, and a third VLAN indicator 440. Although the present embodiment shows only three different VLAN indicators, the number of different VLANs and VLAN indicators can range from 1 to as many as the resources of network device 110 will allow. In many embodiments, the maximum number will be even more than the number of ports 200 of network device 110.

Second area 402 can have a Manage VLANs section 445 and a Port Assignments section 460. In the exemplary Manage VLANs section 445, all of the VLANs of network device 110 can be shown. Such VLANs can be shown with VLAN indicators 450. Examples of VLAN indicators 450 include first VLAN indicator 430, second VLAN indicator 435, and third VLAN indicator 440. However, VLAN indicators 450 can also show a VLAN ID and/or a VLAN name associated with the VLAN, in addition to a graphical representation of the VLAN that can be used in other areas of the graphical user interface. When displayed in the Manage VLANs section 445, the VLANs are selectable. They can be selected and used in the port configuration methods described herein.

In a non-limiting example, VLAN Options 455 can comprise an option to create a VLAN, an option to delete a VLAN, and an option to edit a VLAN. Creating a VLAN can comprise inputting a VLAD ID and name, and then confirming the input. Deleting a VLAN can comprise selecting a VLAN, selecting the option to delete the VLAN, and then confirming. Editing a VLAN can comprise selecting an option to edit the VLAN, changing the VLAN name, and then confirming. In other embodiments, other options can be available to the user to manage the VLANs of network device 110. If the user chooses to confirm an option, for example by clicking a "create" button, client 105 can transmit the settings to network device 110 to update configuration file 210 and store the settings.

In an exemplary Port Assignments section 460, the user can have separate areas to configure ports. There can be a separate Access mode area 465, Hybrid mode area 470, and Trunk mode area 475. All of the created VLANs displayed in the Manage VLANs section 445 can be shown in the Access mode area 465, with associated VLAN indicators 450. Each VLAN in Access mode area 465 can be selectable, which when selected would allow the user to choose ports from first area 401 to assign to the selected VLAN. As a non-limiting example, a user can click on multiple ports in first area 401 or can click and drag to select them, then drag from any of the selected ports down to Access mode area 465 to the VLAN they want to assign the ports to. The same method of port assignment can be performed in Hybrid mode area 470 and Trunk mode area 475 as well.

The selected ports would then be displayed as port indicators 480, and would be associated with VLAN indicators 450. Alternatively, ports can automatically be populated and displayed as port indicators 480 as soon as the user selects them in first area 401. The Hybrid mode area 470 and Trunk mode area 475 can also have a tagging indicator 485, which displays VLAN indicators 450 in a way that enables the user to see and configure which VLANs are tagged and which are untagged. In the present embodiment, in Hybrid mode area 470, tagging indicator 485 shows text that represents "tagged" and "untagged," and then places the VLAN indicators 450 in a table-like format that shows which VLAN is associated with which text. Each row in the table can be selectable and editable to specify at least one VLAN that is untagged and at least one VLAN that is tagged. Additionally, there can be an add option 490, which can be used to add rows to the table, thereby allowing the user to make additional port and VLAN configurations. In the present embodiment, since all VLANs are displayed in Access mode area 465, the rows cannot be deleted and there can be an option to clear a port assignment instead.

In the present embodiment, the Trunk mode area 475 has a similar layout and configuration options to the Hybrid mode area 470, except that there is no option to specify "untagged" ports and VLANs. The Hybrid mode area 470 and Trunk mode area 475 can also display the corresponding hybrid mode indicator 420 and/or trunk mode indicator 425 around each "tagged" VLAN indicator in the relevant area. The hybrid mode indicator 420 and trunk mode indicator 425 can also be displayed around the relevant configured port in first area 401. In such a manner, a user can easily see in first area 401, through the graphical port representations and associated indicators, which port is assigned to which VLAN, which ports are active and which are inactive, and whether the port are in access mode, hybrid mode, or trunk mode. In other embodiments, all indicators can look different, have different colors or shapes, or be located in different areas. The steps for creating the VLANs and configuring the ports can also be different. However, all of the described features should be presented on one page in the manual port configuration 400 GUI.

In the present embodiment, Manual Configuration Options 495 can comprise options to apply changes, cancel changes, clear a port assignment, and/or delete a row or other input from the Port Assignments section 460. If the user chooses to apply the changes, for example by clicking an "apply" button, client 105 can transmit the settings to network device 110 to update configuration file 210 and store the settings.

Figure 5:
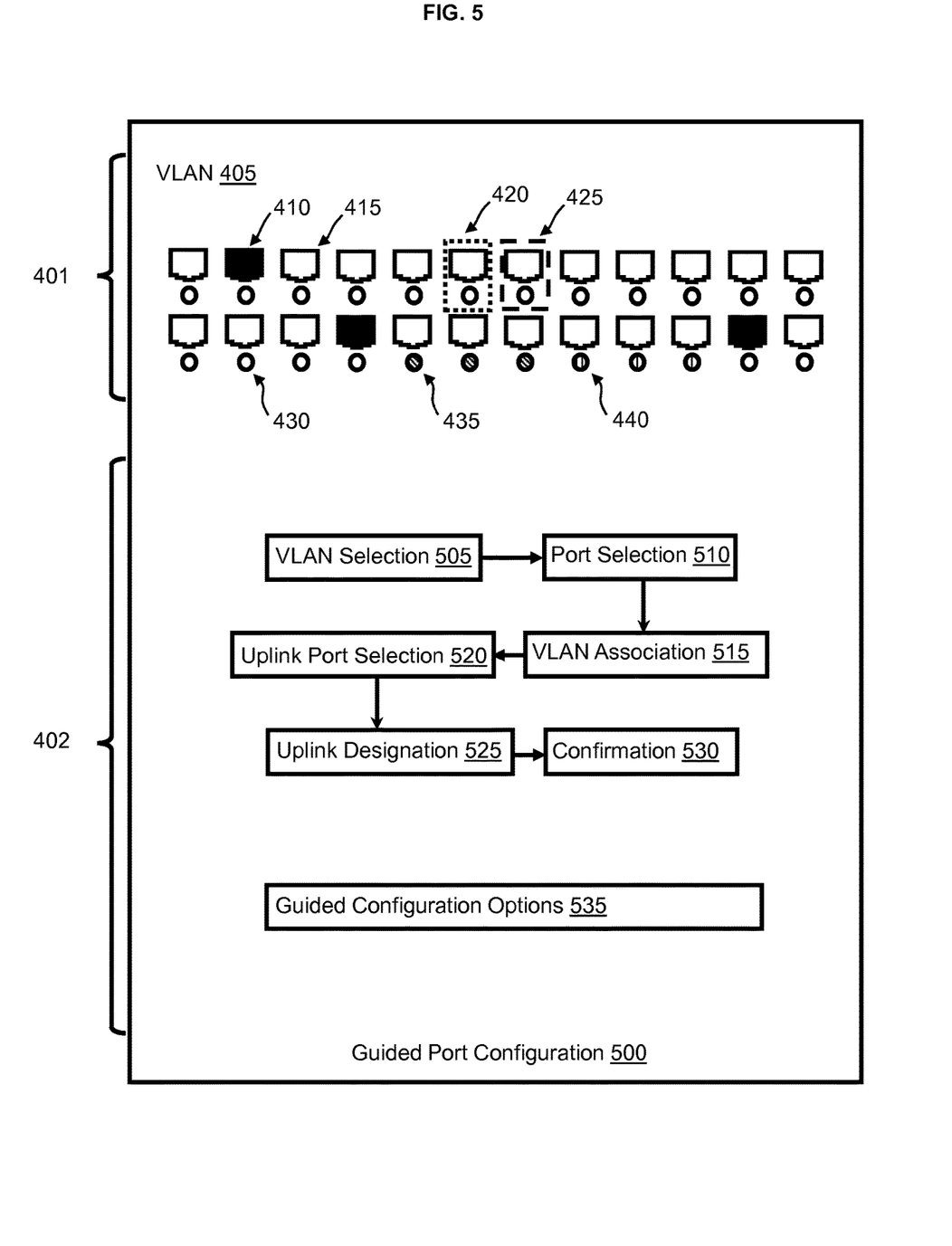
FIG. 5 shows an exemplary guided port configuration GUI layout and an exemplary guided configuration flow.

Referring to FIG. 5, an exemplary guided port configuration GUI layout and an exemplary guided configuration flow are shown. In other embodiments, the GUI layout can look different and different graphical representations can be used. Additionally, the guided configuration flow steps can be different or have a different order. Client 105 can display a GUI for guided port configuration 500. The GUI can have a first area 401 showing graphical representation of ports 200 of network device 110. The GUI can have a second area 402 showing VLAN configuration setting and options of network device 110. Second area 402 can change as a user switches between different methods of VLAN configuration, but first area 401 can remain largely the same, displaying graphical representations of ports 200 and their current or temporary assigned settings. First area 401 can have a VLAN section 405 which graphically displays the VLANs associated with ports 200 of network device 110. Ports 200 can be displayed as active ports 410 or inactive ports 415. Displayed ports can also have a hybrid mode indicator 420 or trunk mode indicator 425. In the present embodiment, a default access mode port has no indicator. However, an indicator can be used if desired. Ports can also have a first VLAN indicator 430, a second VLAN indicator 435, and a third VLAN indicator 440. Although the present embodiment shows only three different VLAN indicators, the number of different VLANs and VLAN indicators can range from 1 to as many as the resources of network device 110 will allow. In many embodiments, the maximum number will be even more than the number of ports 200 of network device 110.

Second area 402 can display different settings and require different inputs at different times, and can also display guided configuration options 535 related to such settings and inputs. The settings, steps, and options in second area 402 can all be part of a guided port and VLAN configuration. In the present embodiment, the first step in guided port configuration 500 is a VLAN selection step 505. VLAN selection step 505 can comprise display of a graphical representation of pre-defined VLANs, which include pre-defined VLAN IDs and pre-defined VLAN names. The user can have the option to select as many of the pre-defined VLANs as they desire, and then to proceed with the guided configuration. If the user chooses to proceed, second area 402 will display a different setting, step, or option, while still being on the same page as first area 401. Instead of proceeding, the user can also choose an option to exit the guided configuration so that they can configure ports and VLANs according to another method (but still remaining on the same page). Such options to proceed or exit can be available after each step in guided port configuration 500.

When the user chooses to proceed, the graphical representation in second area 402 can change to show the pre-defined VLANs that the user selected in VLAN selection step 505. The second step is a port selection step 510. Port selection step 510 can comprise the user, in first area 401, selecting as many displayed ports as they desire. The third step is a VLAN association step 515. VLAN association step 515 can comprise the user dragging the selected ports into second area 402 and releasing them over a graphical representation of the particular pre-defined VLAN that they would like to assign the ports to. The user can then repeat these selection and dragging steps to assign as many ports as they like to any of the pre-defined VLANs that they chose in VLAN selection step 505. Once all ports have been assigned a VLAN, the user can have the options to proceed with guided port configuration 500, to clear any assignments that have been made, and to move back to a previous step in the guide port configuration 500.

The fourth step is an uplink port selection step 520. When the user chooses to proceed, the graphical representation in second area 402 can change to show the default uplink ports for network device 110. Uplink ports can be ports configured in hybrid mode and set with a VLAN ID of 1, along with any VLAN ID set previously as tagged. In the present embodiment, ports 1 and 24 are automatically designated as uplink ports, but any other ports could be so designated. The automatically designated ports are not changeable by the user, thereby keeping the user from locking themselves out of network device 110. Uplink port selection step 520 can comprise the user, in first area 401, selecting as many displayed ports as they desire. In the present embodiment, however, ports 1 and 24 cannot be selected because they are automatically set as uplink ports. The fifth step is an uplink port designation step 525. Uplink port designation step 525 can comprise the user dragging the selected ports into second area 402 and releasing them over the graphical representation of the default uplink ports, thereby changing or adding to the ports that will be designated as uplink ports. The user can have the options to proceed with guided port configuration 500, to clear any assignments they have made, and to move back to a previous step in the guide port configuration 500.

The sixth step is a confirmation step 530. When the user chooses to proceed, the graphical representation in second area 402 can change to show a summary of the VLAN associations and uplink designations made in the previous steps. Confirmation step 530 can comprise the user reviewing which ports they have assigned to which pre-defined VLAN and which ports they have designated as uplink ports. Guided configuration options 535 can comprise an option to confirm the settings (thereby concluding guided port configuration 500) and an option to move back to a previous step in the guided port configuration 500. If the user chooses to confirm the settings, for example by clicking an "apply" button, client 105 can transmit the settings to network device 110 to update configuration file 210 and store the settings.

In the present embodiment, hybrid mode indicator 420 and trunk mode indicator 425 are displayed in a way that may not be consistent with a guided port configuration, if for example guided port configuration does not provide the user with an option to specify port mode. This is because the display in the present embodiment is of current settings which have been configured with a different method (e.g. the manual port configuration method). The user has not yet gone through the steps of guided port configuration. Once the user begins the process, hybrid mode indicator 420 and trunk mode indicator 425 can disappear and first area 401 can display graphical representations consistent with selections made with the guided port configuration method.

Figure 6:
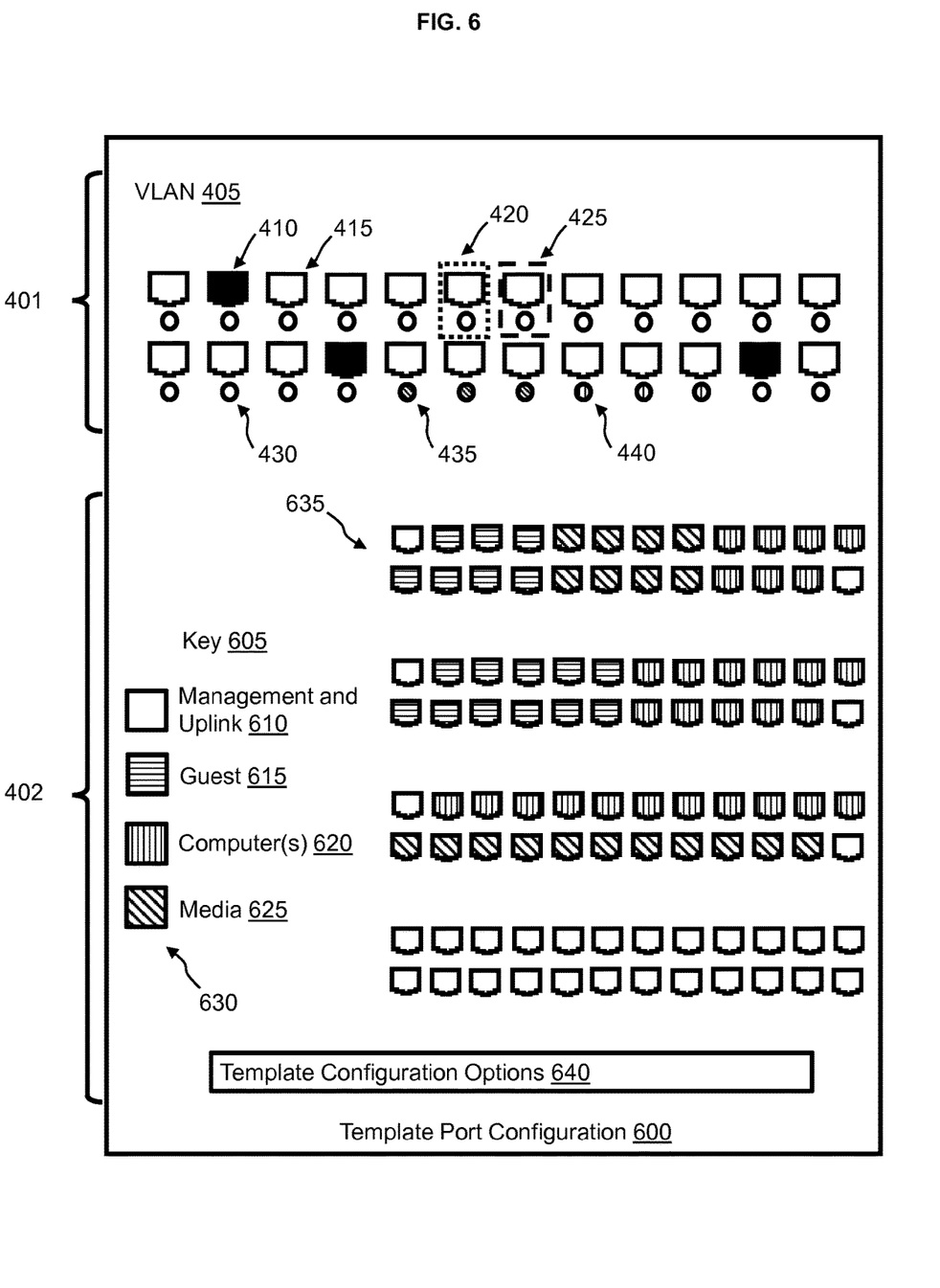
FIG. 6 shows an exemplary template port configuration GUI layout.

Referring to FIG. 6, an exemplary template port configuration GUI layout is shown. In other embodiments, the GUI layout can look different and different graphical representations can be used. Client 105 can display a GUI for template port configuration 600. The GUI can have a first area 401 showing graphical representations of ports 200 of network device 110. The GUI can have a second area 402 showing VLAN configuration setting and options of network device 110. Second area 402 can change as a user switches between different methods of VLAN configuration, but first area 401 can remain largely the same, displaying graphical representations of ports 200 and their current or temporary assigned settings. First area 401 can have a VLAN section 405 which graphically displays the VLANs associated with ports 200 of network device 110. Ports 200 can be displayed as active ports 410 or inactive ports 415. Ports can also have a hybrid mode indicator 420 or trunk mode indicator 425. In the present embodiment, a default access mode port has no indicator. However, an indicator can be used if desired. Ports can also have a first VLAN indicator 430, a second VLAN indicator 435, and a third VLAN indicator 440. Although the present embodiment shows only three different VLAN indicators, the number of different VLANs and VLAN indicators can range from 1 to as many as the resources of network device 110 will allow. In many embodiments, the maximum number will be even more than the number of ports 200 of network device 110.

Second area 402 can display a key 605, and exemplary pre-defined VLANs in key 605 comprising management and uplink VLAN 610, guest VLAN 615, computer(s) VLAN 620, and media VLAN 625. Different and/or additional pre-defined VLANs can also be displayed. Each pre-defined VLAN can have a different key indicator 630. Key indicators 630 can be, as non-limiting examples, different colors or different shapes for each pre-defined VLAN. Second area 402 can also display template options 635. In the present embodiment, there are four template options 635 that the user can choose from. In other embodiments, one or more template options 635 can be displayed, corresponding to a variety of pre-defined VLANs and port configurations. The pre-defined port configurations can comprise VLAN assignments and uplink port assignments. In the present embodiment, all template options 635 have ports 1 and 24 assigned as uplink ports. The uplink ports can be set as hybrid ports with a VLAN ID of 1 (corresponding to the management VLAN), but can also be tagged ports set to whichever VLAN is selected. The other ports have different VLANs assigned to them, as shown by the different key indicators 630. In the present embodiment, hybrid mode indicator 420, trunk mode indicator 425, first VLAN indicator 430, second VLAN indicator 435, and third VLAN indicator 440 displayed in first area 401 are displayed in a way that may not be consistent with any of the template options 635. This is because those are current settings which have been configured with a different method (e.g. the manual port configuration method). The user has not yet selected or applied a template. Once the user begins the template port configuration method, or selects a template option 635, the graphical representations in first area 401 will change to match the appropriate key indicator 630 of the selected template option 635.

In the present embodiment, template configuration options 640 comprise an option to confirm a template selection, and an option to exit so that the user can configure ports and VLANs according to another method. The user can select one of the template options 635 and then confirm the template selection. When they confirm, the client 105 can send the template configuration to the network device 110 and update the configuration file 210 accordingly. In such a manner, the VLAN and uplink port assignments of the selected template option 635 can be configured for network device 110.

What is claimed is:

1. A method of managing VLAN configurations on a network device, the method comprising:
    connecting, by a client, to the network device;
    presenting, by the client, a graphical user interface of the network device to a user of the client, wherein the graphical user interface comprises:
        a first area displaying a plurality of ports of the network device; and
        a second area displaying a configuration interface, the configuration interface enabling the user to make a VLAN assignment for each of the plurality of ports, both the first area and the second area being displayed on one page in the graphical user interface, and wherein the graphical user interface enables displaying a port hybrid mode indicator that encloses a configured port in the first area and a matching port hybrid mode indicator that encloses a VLAN indicator of the configured port in the second area;
    accepting, through the graphical user interface, user instructions for making the VLAN assignment, wherein at least one of the VLAN assignments is made when the user clicks and drags at least one of the ports from the first area to a VLAN in the configuration interface in the second area; and
    transmitting, by the client, a signal to the network device, the signal encoding the user instructions and enabling the network device to make the VLAN assignment.

2. The method of claim 1, further comprising:
    in response to the signal, updating, by the network device, a configuration file stored on a storage medium in the network device.

3. The method of claim 1, wherein:
    the client is a computer and the graphical user interface is presented in a web browser on the computer.

4. The method of claim 1, wherein:
    the client is a mobile phone and the graphical user interface is presented in a web browser on the mobile phone.

5. The method of claim 1, wherein:
    the network device is a managed switch.

6. The method of claim 1, further comprising:
    receiving a first user selection of a VLAN displayed in the configuration interface of the second area;

receiving a second user selection of at least one of the plurality of ports displayed in the first area; and receiving a confirmation of the first user selection and the second user selection.

7. The method of claim 6, further comprising:

prior to receiving the first user selection, receiving a third user selection of an option to create the VLAN; and responsive to receiving the third user selection, creating the VLAN.

8. The method of claim 7, wherein:

creating the VLAN comprises, in response to a user input, assigning a VLAN ID and a VLAN name to the VLAN.

9. The method of claim 1, further comprising:

receiving a first user selection of a first option to create a hybrid configuration;

receiving a second user selection of at least one VLAN from a group of VLANs to designate as untagged;

receiving a third user selection of at least one VLAN from the group of VLANs to designate as tagged;

receiving a fourth user selection of at least one of the plurality of ports displayed in the first area; and receiving a confirmation of the first user selection, the second user selection, the third user selection, and the fourth user selection.

10. The method of claim 9, further comprising:

prior to receiving the first user selection, receiving a fifth user selection of a second option to create the group of VLANs; and responsive to receiving the fifth user selection, creating the group of VLANs.

11. The method of claim 1, further comprising:

receiving a first user selection of a first option to create a trunk configuration;

receiving a second user selection of at least one VLAN from a group of VLANs to designate as tagged;

receiving a third user selection of at least one of the plurality of ports displayed in the first area; and receiving a confirmation of the first user selection, the second user selection, and the third user selection.

12. The method of claim 11, further comprising:

prior to receiving the first user selection, receiving a fourth user selection of a second option to create the group of VLANs; and responsive to receiving the fourth user selection, creating the group of VLANs.

13. The method of claim 1, further comprising:

receiving a first user selection of at least one VLAN from a pre-defined group of VLANs;

receiving a second user selection of at least one of the plurality of ports displayed in the first area;

receiving a first user interaction associating the first user selection with the second user selection;

receiving a third user selection of at least one port not previously selected;

receiving a second user interaction designating the at least one port not previously selected as an uplink port; and receiving a confirmation of the first user selection, the second user selection, the first user interaction, the third user selection, and the second user interaction.

14. The method of claim 1, further comprising:

receiving a first user selection of a template, the template comprising:
 at least one pre-defined VLAN assigned to a group of the plurality of ports;
 at least one pre-defined color indicator associated with the at least one predefined VLAN; and
 pre-defined uplink ports; and receiving a confirmation of the first user selection.

15. The method of claim 1, wherein:

the first area comprises a color indicator for each of the plurality of ports, the color indicator corresponding to a VLAN that each of the plurality of ports has been assigned to.

16. A method of managing VLAN configurations on a network device, the method comprising:

receiving a connection, by a network device, from a client;

serving up, to the client, a graphical user interface of the network device, wherein the graphical user interface enables a user of the client to input instructions for making a VLAN assignment, and wherein the graphical user interface comprises:
 a first area displaying a plurality of ports of the network device; and
 a second area displaying a configuration interface, the configuration interface enabling the user to make the VLAN assignment for each of the plurality of ports, both the first area and the second area being displayed on one page in the graphical user interface, wherein at least one of the VLAN assignments is made when the user clicks and drags at least one of the ports from the first area to a VLAN in the configuration interface in the second area, and wherein the graphical user interface enables displaying a port hybrid mode indicator that encloses a configured port in the first area and a matching port hybrid mode indicator that encloses a VLAN indicator of the configured port in the second area; and receiving, by the network device, a signal from the client, the signal encoding the instructions and enabling the network device to make the VLAN assignment.

17. The method of claim 16, further comprising:

in response to the signal, updating, by the network device, a configuration file stored on a storage medium in the network device.

18. A network device comprising:

a plurality of ports;

a processor;

a storage medium;

a configuration file stored in the storage medium; and a graphical user interface module, wherein the graphical user interface module is stored in the storage medium and configured to be executed by the processor, the graphical user interface module comprising:
 instructions for displaying, in a first area of a client device, a graphical representation of the plurality of ports of the network device;
 instructions for displaying, in a second area of the client device, a configuration interface, the configuration interface enabling a user of the client device to make a VLAN assignment for each of the plurality of ports, wherein at least one of the VLAN assignments is made when the user clicks and drags at least one of the ports from the first area to a VLAN in the configuration interface in the second area, wherein both the first area and the second area are displayed on one page in a graphical user interface of the client device, and wherein the graphical user interface enables displaying a port hybrid mode indicator that encloses a configured port in the first area and a matching port hybrid mode indicator that encloses a VLAN indicator of the configured port in the second area; and
 instructions for receiving, from the client device, a signal comprising a user input.

19. The network device of claim 18, wherein:
the graphical user interface module further comprises instructions for updating the configuration file based on the received signal, thereby making the VLAN assignment.

* * * * *